US012601632B2

(12) United States Patent
Grenov et al.

(10) Patent No.: US 12,601,632 B2
(45) Date of Patent: Apr. 14, 2026

(54) AUTO-FOCUS FOR SPECTROMETERS

(71) Applicant: THERMO ELECTRON SCIENTIFIC INSTRUMENTS LLC, Madison, WI (US)

(72) Inventors: Alexander Grenov, Madison, WI (US); Min Yan, Verona, WI (US); Mike Bradley, Fitchburg, WI (US)

(73) Assignee: Thermo Electron Scientific Instruments LLC, Madison, WI (US)

( * ) Notice: Subject to any disclaimer, the term of this patent is extended or adjusted under 35 U.S.C. 154(b) by 327 days.

(21) Appl. No.: 18/084,249

(22) Filed: Dec. 19, 2022

(65) Prior Publication Data

US 2023/0194346 A1      Jun. 22, 2023

Related U.S. Application Data

(60) Provisional application No. 63/291,217, filed on Dec. 17, 2021.

(51) Int. Cl.
| | |
|---|---|
| *G01J 3/28* | (2006.01) |
| *G01J 3/02* | (2006.01) |
| *G01N 21/35* | (2014.01) |
| *G01N 21/359* | (2014.01) |

(52) U.S. Cl.
CPC ........... *G01J 3/2823* (2013.01); *G01J 3/0237* (2013.01); *G01N 21/359* (2013.01); *G01N 2021/3595* (2013.01); *G01N 2201/127* (2013.01)

(58) Field of Classification Search
CPC .......... G01J 3/2823; G01J 3/0237; G01J 3/42; G01N 21/359; G01N 2021/3595; G01N 2201/127; G01N 21/65; G01N 21/01; G01N 21/35; G01N 2021/0112; G02B 21/365; G02B 27/40; G02B 21/26; G02B 21/244; G02B 21/36
See application file for complete search history.

(56) References Cited

U.S. PATENT DOCUMENTS

| | | | | |
|---|---|---|---|---|
| 6,130,745 | A | * | 10/2000 | Manian ............... G02B 21/241 |
| | | | | 356/123 |
| 10,146,041 | B1 | * | 12/2018 | Putman .................... G02B 7/38 |
| 10,545,099 | B1 | * | 1/2020 | Chen .................. G01N 21/9505 |
| 11,356,594 | B1 | * | 6/2022 | Bruguier .............. G02B 21/361 |
| 2007/0252984 | A1 | * | 11/2007 | Van Beek ............. G01J 3/0237 |
| | | | | 356/311 |

(Continued)

FOREIGN PATENT DOCUMENTS

| | | | |
|---|---|---|---|
| EP | 1098166 A2 | 5/2001 | |
| WO | WO-2016170370 A2 * | 10/2016 | ............. G02B 21/04 |

OTHER PUBLICATIONS

EP22212741.7, Extended European Search Report, May 15, 2023, 11 pages.

*Primary Examiner* — Michelle M Iacoletti
*Assistant Examiner* — Maher Yazback
(74) *Attorney, Agent, or Firm* — Bo Wang

(57) ABSTRACT

Methods and systems for automatically adjusting a sample position in a spectrometer, such as a Fourier-transform infrared (FTIR) spectrometer, are described. The sample may be automatically positioned using an auto-focusing procedure. For example, images including an aperture marker are acquired by directing light towards the sample via an aperture. The sample position may be adjusted based on features extracted from the aperture marker images.

19 Claims, 10 Drawing Sheets

(56)      References Cited

U.S. PATENT DOCUMENTS

| 2010/0157086 | A1 |  | 6/2010 | Segale et al. | |
|---|---|---|---|---|---|
| 2019/0120753 | A1 | * | 4/2019 | Prater | .................... G01N 21/59 |
| 2020/0200682 | A1 | * | 6/2020 | Hagen-Eggert | .... G01N 21/6486 |
| 2020/0257100 | A1 | * | 8/2020 | Putman | .............. G01N 21/6458 |
| 2020/0301124 | A1 | * | 9/2020 | Annibale | ............. G02B 21/365 |
| 2020/0319443 | A1 | * | 10/2020 | Liu | ....................... G02B 21/006 |
| 2020/0371335 | A1 | * | 11/2020 | Amthor | ..................... G06T 7/73 |
| 2021/0055211 | A1 | * | 2/2021 | Nagamori | ................ G06N 3/08 |
| 2021/0373313 | A1 | * | 12/2021 | Sandkuijl | ........... G02B 21/0032 |
| 2023/0314219 | A1 | * | 10/2023 | Sasayama | ............. G01J 3/0218 |
| | | | | | 356/301 |
| 2023/0350186 | A1 | * | 11/2023 | Ogien | ................. G02B 21/365 |
| 2024/0192477 | A1 | * | 6/2024 | Young | ................. G02B 21/361 |

* cited by examiner

401

AUTO-FOCUS FOR SPECTROMETERS

PRIORITY

This application claims priority to U.S. Provisional Patent Application 63/291,217, titled Auto-focus for Spectrometers, by Grenov et al., filed on Dec. 17, 2021, which is incorporated by reference in its entirety.

TECHNICAL FIELD

This disclosure relates to spectrometers, and more particularly to methods and systems for positioning the sample in a spectrometer using an auto-focusing procedure. The systems include spectrometers such as a Fourier-transform infrared (FTIR) spectrometer or a Raman spectrometer.

BACKGROUND

Spectrometers, such as Fourier-transform infrared (FTIR) spectrometers, can include an optical microscope for observing a sample. Typically, the sample is placed onto a support structure, such as a sample holder, and light (such as visible light) is used to illuminate the entire or most of the sample using an illumination source. The optical microscope is used to visualize (or image) the sample under illumination.

Once the desired part of the sample is visualized or imaged under the illumination, an analytical optical system, using a different illumination source, is then used to illuminate a region of interest of the sample for analysis. Light from the sample is then transmitted via optics to a detector of the spectrometer. By detecting the spectrum of the light from the sample, absorption of different frequencies of light by the sample is determined. The acquired spectrum is indicative of the molecular "fingerprint" of the sample and used to identify the sample composition in the region of interest.

Properly focusing the optical microscope on the sample provides a clear visualization and ensures the focal point is at the correct position for generating the spectrum acquired by the analytical optical system. Thus, the position of the sample relative to the optical microscope and the analytical optical system should be adjusted such that the focal point locates essentially at the sample surface. For example, the z-direction of the sample stage can be adjusted to position the sample surface close to the focal point of the spectrometer.

SUMMARY

In one embodiment, an imaging system comprises a sample stage for positioning a sample; an aperture; a camera; an objective; a controller including a processor and a non-transitory memory, wherein by executing computer readable instructions stored in the non-transitory memory, the imaging system is configured to: direct a first light to the sample sequentially through the aperture and the objective; generate a first image including an aperture marker by collecting light from the sample via the camera; determine a similarity score based on the first image and an expected aperture marker image; and adjust a distance between the objective and the sample stage based on the similarity score.

In some implementations, a method for positioning a sample in an imaging system comprises directing a first light to the sample sequentially through an aperture and an objective; generating a first image including an aperture marker by collecting light from the sample via a camera;

determining a similarity score based on the first image and an expected aperture marker image; and adjusting a distance between the objective and the sample based on the similarity score.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Like reference numerals refer to corresponding parts throughout the several views of the drawings.

DETAILED DESCRIPTION

Sample features and composition may be determined using an imaging system, such as a spectrometer, including a digital optical microscope and an analytic system. In one example, the spectrometer may be a Fourier-transform infrared (FTIR). The optical microscope can be used to observe the sample for analysis. The optical microscope may capture and display the sample image. The analytical system can be used to collect light reflected or transmitted from the sample. A detector of the analytical system captures the sample light passed through an aperture, and then generates a spectrum that is indicative of the molecular composition of the sample.

Figure 5:
FIG. 5 illustrates an example of a ghost image observed using the camera of the spectrometer.

One way to position the sample in a spectrometer is to adjust the sample position based on the sample images acquired by the optical microscope. For example, the sharpness of objects (or sample features) in the sample image can be used to position the sample at the focal point of the optical microscope. However, Applicant recognizes that for samples having a highly reflective surface or samples with few objects (or featureless), adjusting sample position based on the image from the optical microscope can be difficult. Further, when the sample surface is positioned far from the focal point, the sample image may be a "ghost image", which is an image with sharp sample features not belonging to the sample. The ghost image cannot be relied upon for focal point position adjustment. An example ghost image is shown at FIG. 5. Objects (or sample features) shown in FIG. 5 are generated from the components of the optical microscope rather than a visual representation of the sample. In one example, the sample position with respect to the focal point of the imaging system (such as the spectrometer) may be adjusted based on an aperture marker image. To generate the aperture marker image, a first light is directed to the sample sequentially through an aperture and an objective. A first image including an aperture marker is acquired by a camera. The distance between the objective and the sample is adjusted based on a similarity score calculated based on the first image and an expected aperture marker image. The similarity score measures the similarity between the observed marker in the first image and the expected aperture marker image. For example, the similarity score represents the similarity of features of the observed aperture marker in the first image and the features of the expected aperture marker in the expected aperture marker image. The features may include one or more of the shape, the size, the position, and compactness, and the orientation of the aperture marker. By calculating the similarity score, the features of the aperture markers are extracted and compared. The aperture may be a part of the analytical system. When acquiring spectral data using the analytical system, the aperture defines the sample region from which the spectrum is acquired. The camera may be a video camera used for acquiring color images of the sample in the optical microscope.

The first light may have a narrow bandwidth (full width half maximum, or FWHM) in the visible wavelength range. As such, the aperture marker in the first image can be represented by a single color (i.e., a monochrome or greyscale image). In one example, the first light is generated from a marker illumination source. The expected aperture maker image, including the size, shape, and position of the expected aperture marker in the expected aperture marker image, may be determined based on the aperture used for directing the first light. The expected aperture marker image may further be determined based on the optical setup of the imaging system. For example, the size of the expected aperture marker is determined based on the objective (e.g. the magnification of the objective) being used.

In one example, the location of the focal point within the spectrometer is determined by the optical configurations of the spectrometer. When the sample is positioned at the focal point, sample image acquired by the optical microscope has an optimal resolution and the spectrum acquired by the analytical system has the optimal quality. The distance between the objective and the sample may be adjusted by moving the sample stage along the optical axis (e.g., Z axis) of the spectrometer.

Adjusting the sample position based on the aperture marker image (i.e., the first image) may be a first part of the auto-focusing procedure. During the first part of auto-focusing, the sample surface is only illuminated with the first light.

The first part of the auto-focusing procedure may be an iterative procedure, wherein the distance between the objective and the sample is adjusted based on the similarity score. In one example, the distance between the objective and the sample may be adjusted using an optimization algorithm. The similarity score is provided to the optimization algorithm and the sample stage position is adjusted based on the output of the optimization algorithm. The optimization algorithm may output the direction and the amount of adjustment.

In some examples, after the first part of the auto-focusing procedure, a second part of the auto-focusing procedure may be executed. For example, a second light generated from the optical microscope illumination source is directed to the sample and a second image is acquired by the camera of the optical microscope. The distance between the objective and the sample is adjusted based on the second image. For example, the distance may be adjusted based on a sharpness of a sample feature captured in the second image. The distance may be adjusted via an optimization algorithm. The range of adjustment of the focal point position in the second part of the auto-focusing procedure may be smaller than the range of adjustment in the first part of the auto-focusing procedure. This is because the first part of the auto-focusing procedure may bring the focal point of the spectrometer in close proximity to the sample surface.

The auto-focusing procedure can be employed to quickly and accurately position the focal point of the spectrometer with respect to the sample surface. The first part of the auto-focusing procedure brings the focal point relatively close to the surface of the sample. Next, in the second part of the auto-focusing procedure, the illumination source used by the optical microscope turns on to further facilitate auto-focusing of the focal point. The first part provides a more coarse-grain adjustment of the focal point, and the second part provides a more fine-grain adjustment of the focal point to provide more refinement to the z-position. This allows for a faster and a more accurate auto-focusing for a sample under analysis using the FTIR spectrometer. More importantly, since the first part of the auto-focusing procedure does not rely on sample features observed in the sample image, the sample can be positioned based on the disclosed method even when the sample is featureless, highly reflective, or has a transparent coating layer.

Though many of the examples herein describe a FTIR spectrometer, other types of spectrometers can be utilized. For example, the techniques described herein can also be used with a Raman spectrometer or with a digital optical microscope.

Figure 1:
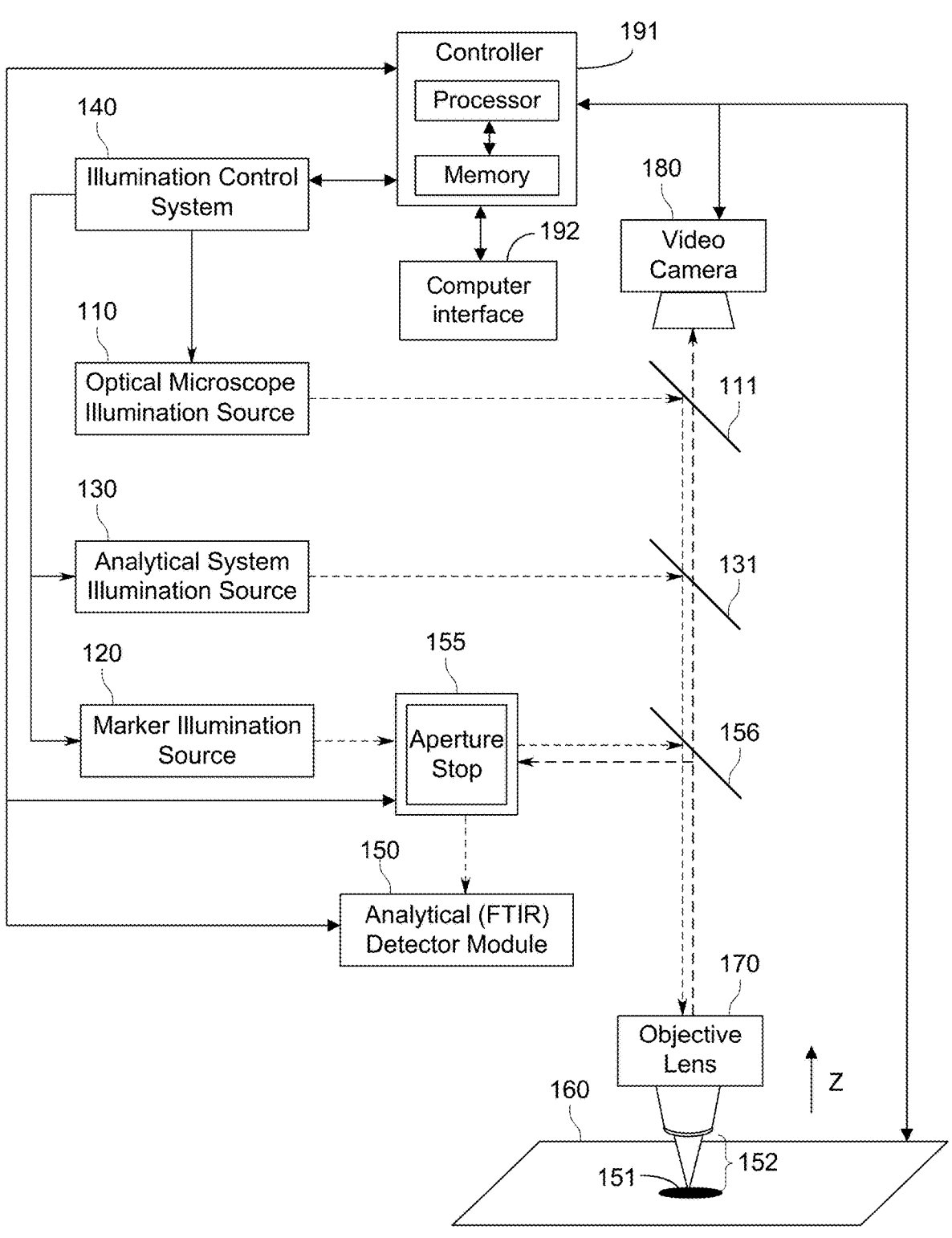
FIG. 1 illustrates an example of a spectrometer.

Turning to FIG. 1, the figure illustrates an example of a spectrometer including an optical microscope and an analytical system. In this example, the optical microscope includes an optical microscope illumination source 110, beam splitter 111, and camera 180. Light (such as visible light) generated from the optical microscope illumination source is directed towards an objective 170 after being reflected by the beam splitter 111. The objective 170 then directs the light towards sample 151 positioned on sample stage 160. A portion of light reflected from the sample passes through the objective is received by camera 180. The light received by the camera may also pass one or more beam splitters. Camera 180 may be a video camera or any other detector for acquiring an image of the sample. The sample image allows for the visualization of sample 151. For example, features or objects on the sample surface can be visualized in the sample image.

The analytical system includes an analytical system illumination source 130, beam splitter 131, aperture stop 155, and detector 150. Light (such as light in NIR-IR wavelength range) generated from analytical illumination source 130 is directed sequentially to beam splitter 131, objective 170, and the sample 151. Light reflected back from the sample sequentially passes the objective 170, beam splitter 156, aperture stop 155 and finally to the analytical detector 150. The aperture stop includes an adjustable aperture, wherein the size of the aperture can be adjusted by a controller, such as the illumination control system. Based on the spectral data received by the analytical detector 150, sample composition, such as the molecular composition, can be determined. The aperture of the aperture stop limits the sample area from which the reflected light can reach the analytical detector. In this way, the aperture stop determines the size of the sample area that is analyzed by the analytical system. In other words, the aperture determines the spatial resolution of the analytical system.

The spectrometer further includes a marker illumination source 120. Light generated from the marker illumination source reaches sample 151 after sequentially passing aperture stop 155, beam splitter 156, and objective 170. Part of light reflected from sample is collected by camera 180 after passing through beam splitters 156, 131 and 111. The light generated from the marker illumination source has a narrower bandwidth comparing to the light generated from the optical microscope illumination source 110. In one example, the wavelength bandwidth of the light generated by the marker illumination source is less than 100 nm. Preferably, the wavelength bandwidth of the light for acquiring the aperture marker image is less than 50 nm or 30 nm. In another example, the light generated by the marker illumination source is blue light. In yet another example, the wavelength of the light for acquiring the aperture marker image is from 440 nm to 480 nm. Using a short wavelength in the visible wavelength range can increase the resolution of the aperture marker image, so that the accuracy of the first part of the auto-focusing procedure is increased. Using a narrow wavelength rage (such as the blue light) may advantageously reduce the effects of external light sources on acquiring the aperture marker images. When the sample is only illuminated by the marker illumination source, the image acquired by camera 180 includes a high intensity region corresponding to the portion of the sample surface illuminated by the light passing through the aperture. The high intensity region in the image is herein referred as an aperture marker. The shape and size of the aperture marker in the image depend on the shape and size of the aperture of the aperture stop, the optical configuration of the spectrometer, and the position of the sample with respect to the objective. The aperture marker in the acquired image can be used to indicate the sample region that is analyzed by the analytical system. As such, when both the optical microscope illumination source and the marker illumination source are turned on, the aperture marker can be used to select the sample region for the analytical acquisition.

Optical microscope illumination source 110, analytical illumination source 130, and marker illumination source 120 may have different optical characteristics (e.g., different wavelengths, intensity, etc.) due to their use by the different parts of the spectrometer. Because light from illumination source 120 is eventually projected on the sample through the aperture stop, less light might be projected onto sample 151 by the marker illumination source than with illumination source 110 of optical microscope.

In some embodiments, the marker illumination source may be a separate model from the spectrometer. In some embodiments, the marker illumination source may be omitted. For example, the marker illumination source may be realized by filtering light generated form the optical microscope illumination source.

The focal point of optical microscope and analytical optical system is the same to allow for proper visualization and sample analysis. Herein, the focal point of the optical microscope and the analytical system is referred as the focal point of the spectrometer. Ideally, the focal point of the spectrometer should be substantially at the sample surface. Thus, the position of the sample is adjusted (such as along the z-axis) by either moving the position of sample 151 or moving the optics (such as the objective) until the focal point is properly positioned. In one example, adjusting the focal point relative to the sample surface includes adjusting the distance 152 between the objective 170 and the sample stage 160.

The imaging system includes a controller 191, which includes a processor and a non-transitory memory for storing the computer readable instructions. By executing the instructions in the processor, the imaging system can execute the methods disclosed herein. The controller may send and receive information from one or more of the illumination control system 140, camera 180, detector 150, aperture stop 155, and sample stage 160. For example, the controller can communicate with the illumination control system 140 to turn on or off any of the optical microscope illumination source 110, the analytical system illumination source 130, and marker illumination source 120. The illumination control system may be a separate module from the controller 191, and include a processor and a memory. In some examples, the illumination control system may be a part of the controller 191. The controller may adjust the size of the aperture by actuating the aperture stop 155. The controller may adjust the distance between the sample stage (or sample) and the objective lens by moving the sample stage 160. The controller receives data acquired from the camera and the detector to generate images or graphs based on the received data. The controller 191 may receive user inputs from computer interface 192, and display acquired information, such as images and sample composition information, via the computer interface. The computer interface may include a display and a user input device.

FIG. 1 shows an imaging system for detecting reflected light from the sample. In some embodiments, the imaging system may collect light from the sample in the transmission mode. The sample is illuminated from a first side of the sample and the light is collected from a second, opposite side of the sample.

Figure 2:
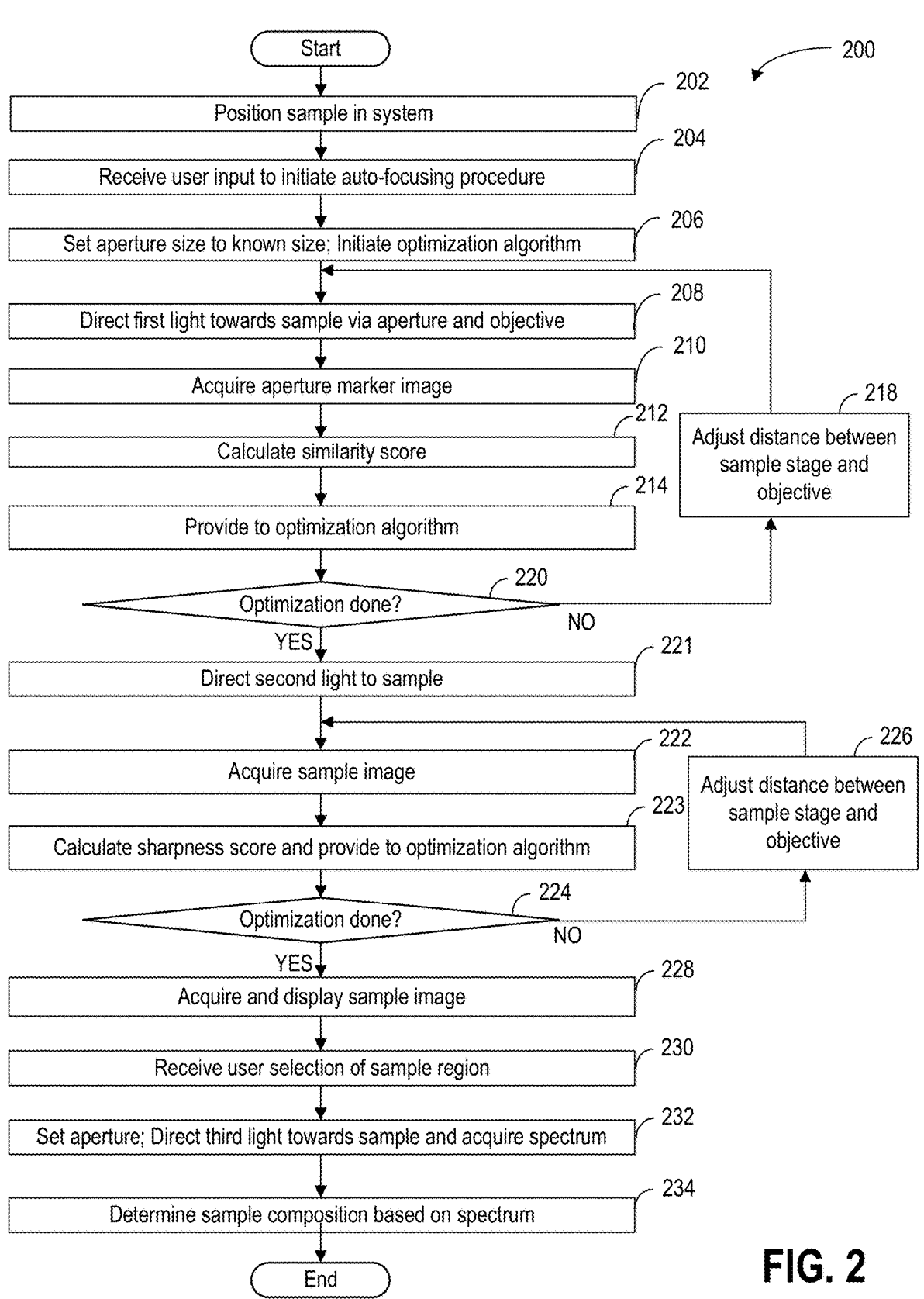
FIG. 2 illustrates an example method for adjusting the sample position using an auto-focusing procedure.

FIG. 2 illustrates an example method 200 for positioning the sample in an imaging system, such as the spectrometer of FIG. 1. The sample position may be adjusted using a two-part auto-focusing procedure, so that the position the focal point of the spectrometer with respect to the sample surface can be quickly and accurately adjusted for acquiring the spectral data. By quickly and accurately positioning the focal point, better quality spectra can be collected.

At 202, a sample is positioned in the imaging system. A user may position and sample on the sample stage of a spectrometer. In some examples, the user may use the optical microscope to visualize the sample. Acquired sample images may be displayed to the user via a user interface (UI).

Figure 6:
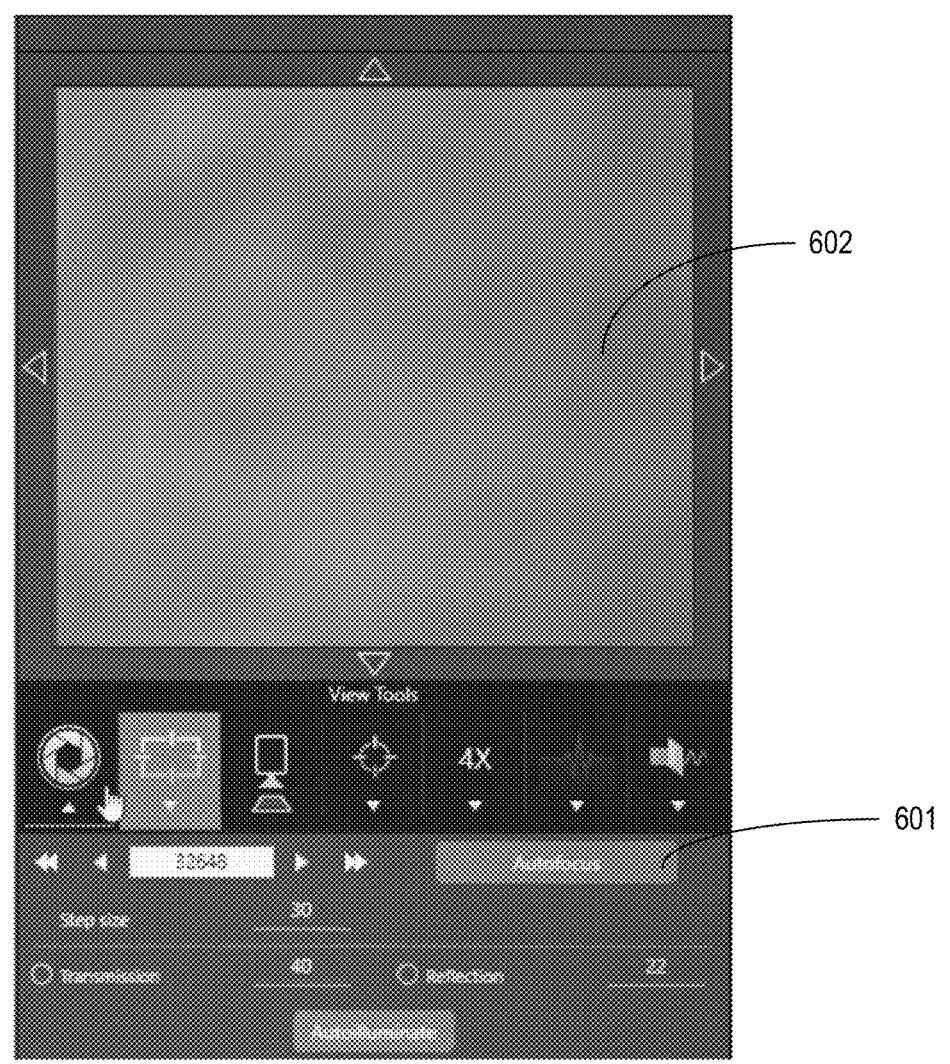
FIG. 6 is an example user interface for initiating the auto-focusing procedure.

At 204, the imaging system receives user input to initiating the auto-focusing procedure. For example, FIG. 6 shows a UI, wherein the sample image 602 acquired at 202 is displayed. The user may click the autofocus button 601 in the UI to initiate the auto-focusing procedure.

At 206, the aperture size is set to a known size by the aperture stop (such as aperture stop 155 in FIG. 1). Setting the aperture to a known size includes setting the aperture to a known shape and size. Further, for an imaging system with multiple objectives, step 206 may include selecting an objective. The expected aperture marker image is determined once the aperture is set and the objective is selected. For example, after the aperture is set and the objective is selected, the expected aperture maker is determined to be a 100 micron (μm)×100 μm square.

Further, the optimization algorithms may be initiated at 206. Initiation of the optimization algorithms may include setting the boundary conditions, such as the range of adjustment of distance between the objective and the sample. The range may be a movement range of the sample stage along the Z axis. Initiation the optimization algorithms may also include setting the minimum step size of the adjustment. The range of the adjustment and the minimum step size set for the optimization algorithm at 214 (the first part of the auto-focusing procedure) may be greater than those in the second part of the auto-focusing procedure (at 223).

At 208, a first light is directed from an illumination source, through the aperture and the objective, towards the sample positioned on the sample stage. The bandwidth of the first light may be narrow and in the visible range. For example, the first light may be of a single color, such as blue. The wavelength bandwidth of the first light may be less than 100 nm. As an example, In FIG. 1, both the optical microscope illumination source 110 and the analytical system illumination source 130 are turned off while the marker illumination source 120 is turned on. This causes a light beam to be projected on sample 151 through the aperture of a known size and shape. The region of sample 151 that is illuminated by the light beam is the same region that can be analyzed by the analytical system.

Figure 7:
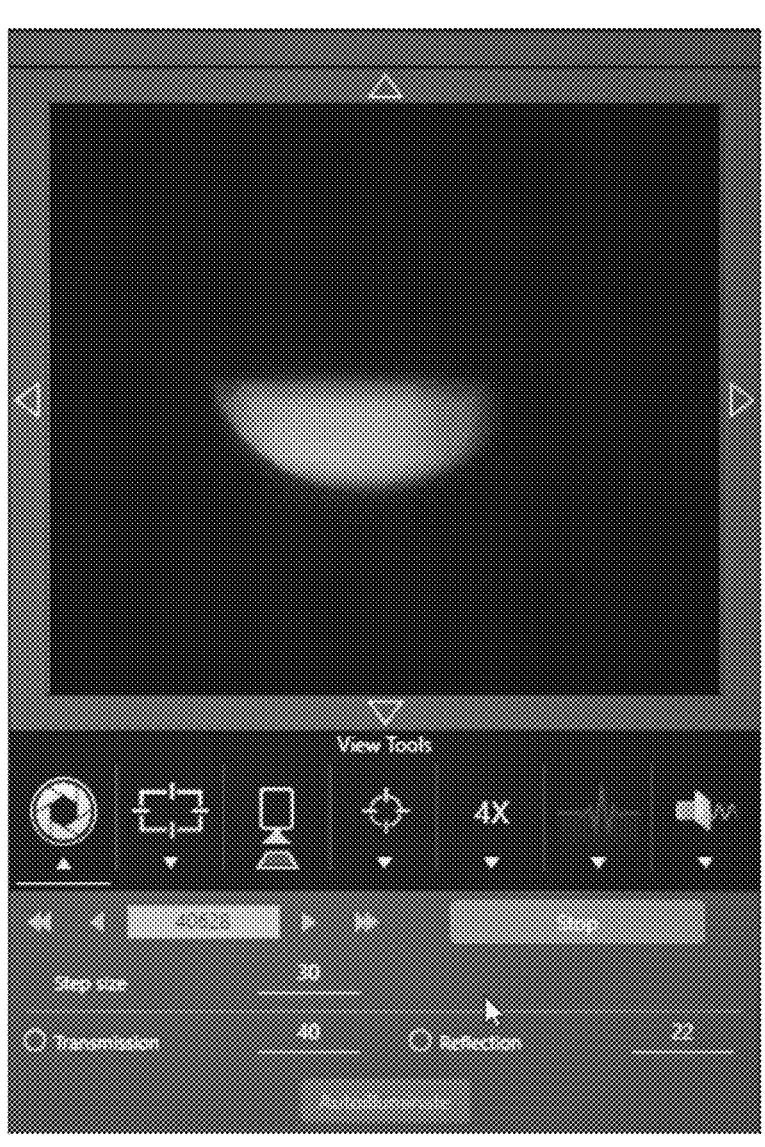
FIG. 7 is an example user interface during the auto-focusing procedure.

At 210, an aperture marker image is acquired by the camera (such as camera 180 of FIG. 1) of the optical microscope. The aperture marker image is acquired by collecting light (reflected or transmitted) from the sample using the camera. In the example of FIG. 1, light reflected from sample 151 passes the beam splitters 156, 131, and 111 before reaching the camera. Due to the narrow bandwidth of the first light. The image (i.e. the aperture marker image) acquired by the camera has a high intensity signal region corresponding to the sample region illuminated by the light passing through the aperture, and the rest of the image is dark (low signal). If the sample surface is at the focal point of the spectrometer, the observed aperture marker should be the same as the expected aperture marker, which resembles the shape of the aperture set at 206. This is depicted in the aperture marker image FIG. 3E, wherein the aperture marker 305 is shown with high intensity close to the center of the image. The aperture used for acquiring the image was in a square shape. The dark regions 315 correspond to objects (or sample features) on the sample surface. The acquired aperture marker image may be displayed to the user as shown in FIG. 7.

At 212, a similarity score is calculated based on the aperture marker image acquired at 210 and the expected aperture marker image determined at 206. In one example, the similarity score may be calculated based on the edges of the aperture marker in the observed and expected aperture marker image. For extracting the edge, a gradient image may be generated by filtering the aperture marker image with a Sobel or Morphological filter. The intensity of the gradient image is then calculated using weighted statistical mean value subtraction. The similarity score may be calculated based on correlation between the extracted edges. The similarity score represents the similarity of features between the observed and the expected aperture marker images. The features may include one or more of the geometric shape, size, compactness, orientation, and position of the aperture marker in the aperture marker image. The higher the similarity score, the more the aperture marker in the image acquired at 210 resembles the expected aperture marker. In one example, the similarity score may be in the range from zero to one, wherein one indicates that the acquired aperture marker image is the same as the expected aperture marker in the expected aperture marker image.

At 214, the similarity score is provided to the optimization algorithm. The algorithm maximizes the similarity score via iterations. Based on the current and previous similarity score, the optimization algorithm outputs the amount of adjustment and the direction of the adjustment for the sample stage. In one example, the optimization algorithm may be a robust version of the Powell algorithm, or other algorithm that uses a curve fitting of the similarity score.

Figure 8A:
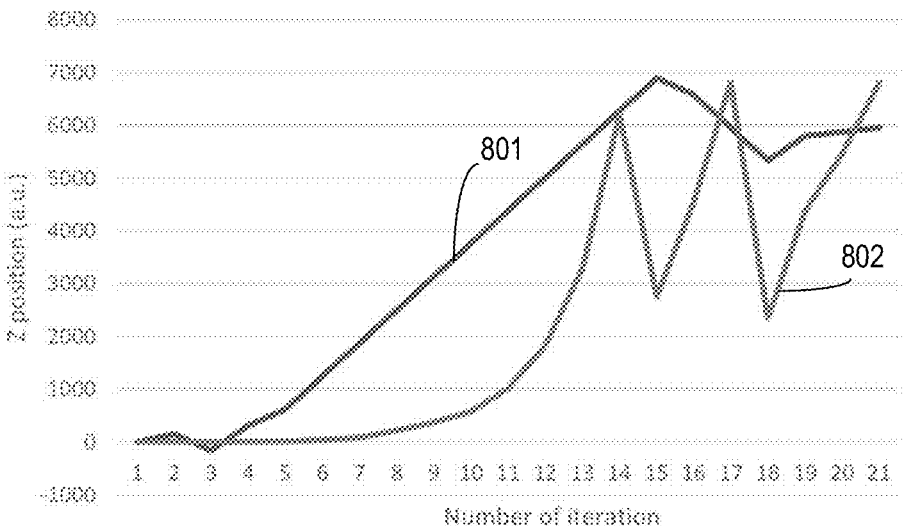
FIGS. 8A and 8B illustrate an optimization process.
Figure 8B:
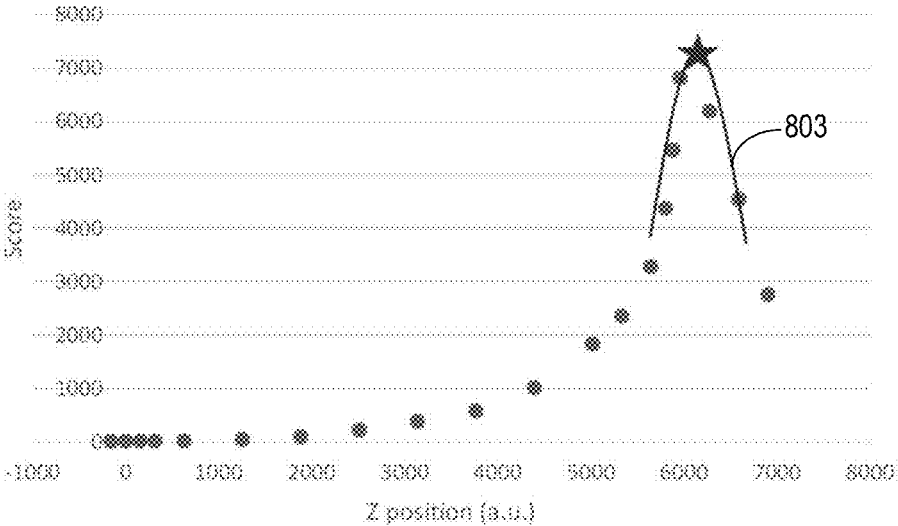

FIGS. 8A and 8B illustrate the progress of an example optimization process. FIG. 8A shows the change of Z position 801 and similarity score 802 as the number of iteration (X-axis) increases. FIG. 8B shows the Z position and the corresponding the similarity score at each iteration in FIG. 8A. As the number of iteration increases, the maximum similarity score was found around Z position of 6800. Curve 803 is a parabolic fitting with 2-d degree polynomial of the similarity score, and the star indicates the maximum of curve 803.

At 220, method 200 checks whether the optimization process is finished. If the answer is YES, method 200 proceeds to 221. Otherwise, the distance between the sample stage and the objective is adjusted at 218 based on the output of the optimization algorithm. In one example, the optimization is finished if the amount of changes in the similarity score between iterations are small. In another example, the optimization if finished if the output amount of adjustment is smaller than the minimum step size set at 206. In yet another example, the optimization is finished if the curve fitting of the similarity score matches an expected parabola (or exponential function).

Figure 3A:
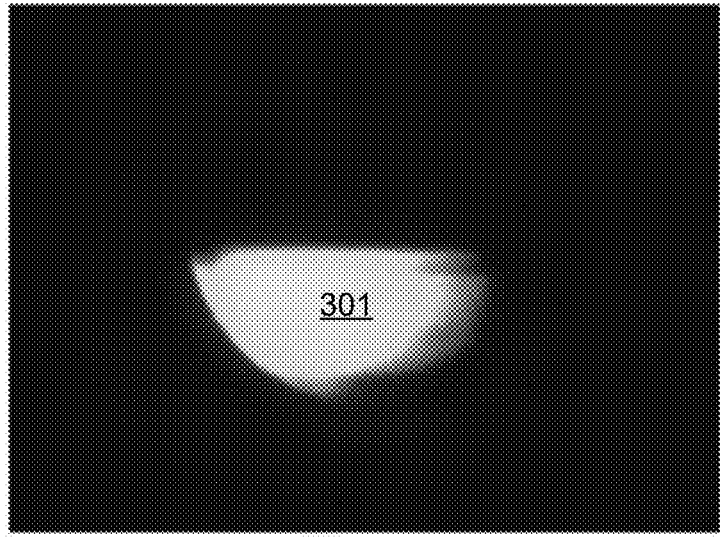
FIGS. 3A-3E are examples of aperture marker images acquired by the camera of the spectrometer.
Figure 3B:
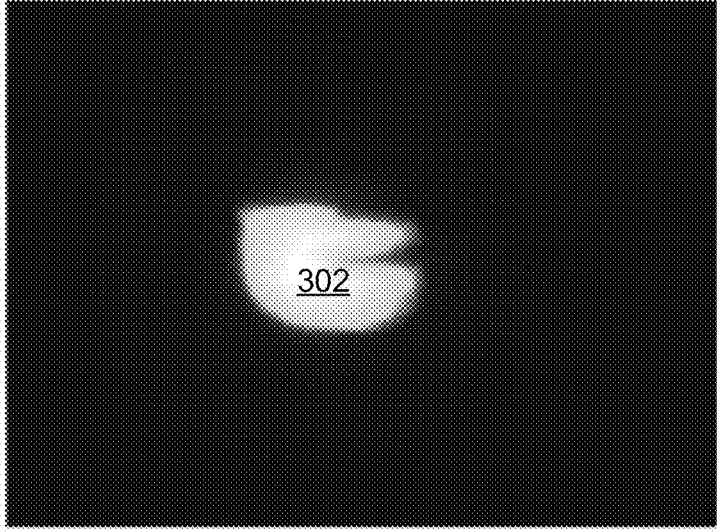
Figure 3C:
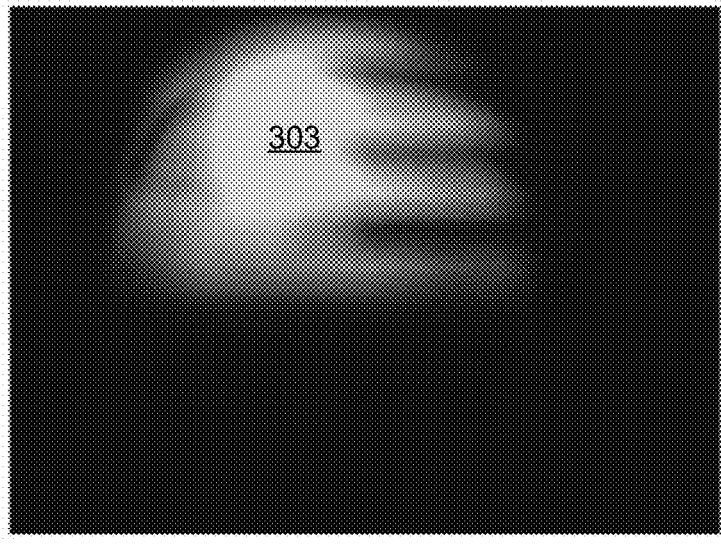
Figure 3D:
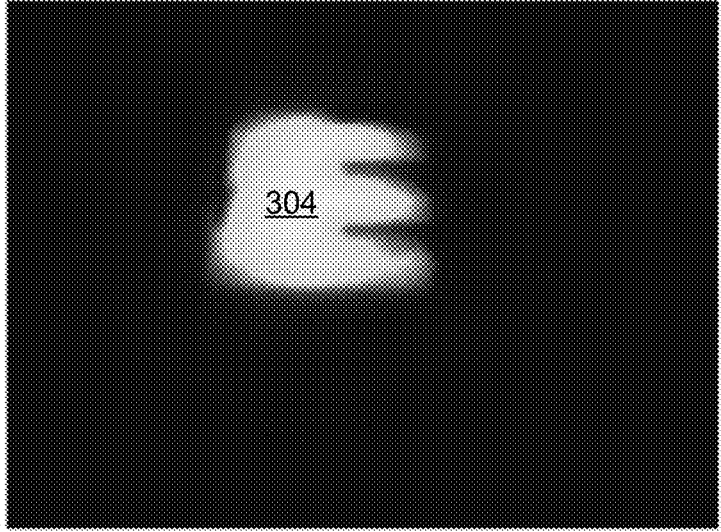
Figure 3E:
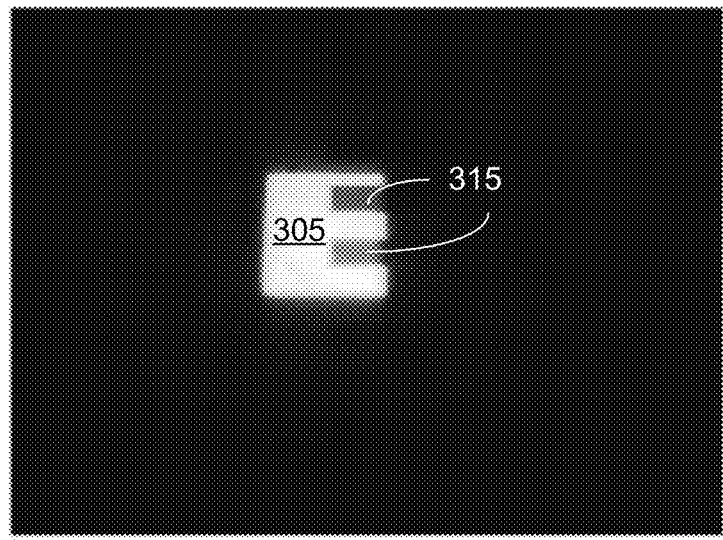

At 218, the distance between the sample stage and the objective is adjusted based on the output of the optimization algorithm. The distance may be adjusted by adjusting position of the sample stage along the Z axis. The distance is adjusted so that the observed aperture marker image is more similar to the expected aperture marker. The distance is adjusted so that the extracted features of the aperture marker are closer to the expected features. In other words, the distance is adjusted to increase the similarity score. The amount of the adjustment may increase responsive to the similarity score lower than the minimum similarity score. That is, when the difference between the observed aperture marker and the expected aperture marker is large, the adjustment may be more aggressive. The movement along the Z axis has larger steps In another example, the direction of the adjustment (i.e. increase or decrease the distance) is determined based on the similarity score, by considering the position of the aperture marker in the acquired image, as well as the shape and size of the observed marker, etc. FIGS. 3A-3E show aperture marker images acquired using 4×objective while adjusting the sample stage position. FIGS. 3A and 3B were acquired when the focal point of the spectrometer was 2 mm and 1 mm above the sample surface. FIGS. 3C and 3D were acquired when the focal point was 2.4 mm and 1 mm below the sample surface. FIG. 3E was acquired when the focal point was at the sample surface. Herein, the direction along the Z direction as indicated in FIG. 1 is referred to as "above" or "higher", and the direction against the Z direction is referred to as "below" or "lower". When the focal point moves higher from the sample surface, the center of the aperture marker (301 and 302) moves down in the aperture marker image. On the other hand, when the center of the aperture marker (303 and 304) moves up in the aperture marker image, when the focal point moves lower from the sample surface. As such, the sample stage may be adjusted based on the position of the center of the observed aperture marker to shorten the duration of the auto-focusing procedure.

In some examples, the direction and amount of the adjustment can be further determined based on one or more of the sharpness of observed aperture marker and the size of the aperture marker.

Turning back to FIG. 2, if the optimization is completed at 220, method 200 proceeds to 221 start the second part of the auto-focusing routine, wherein the distance between the objective and the sample stage is adjusted based on the sample image.

At 221, a second light is directed to sample without passing the aperture. For example, in FIG. 1, the optical microscope illumination source 110 is turned on. The second light generated from the optical microscope illumination source is reflected by beam splitter 111 and then passes through beam splitters 131 and 156, before reaching the objective 170. Objective focuses the light onto the sample 151.

At 222, the sample image is acquired using the camera. For example, as shown in FIG. 1, reflected light from the sample passes through beam splitter 156, 131, and 111, and is collected by camera 180. The sample image is a multi-colored image showing sample features. The marker illumination source 120 may be turned off or remain on at step 222. The sample image may be displayed to the user.

Figure 4:
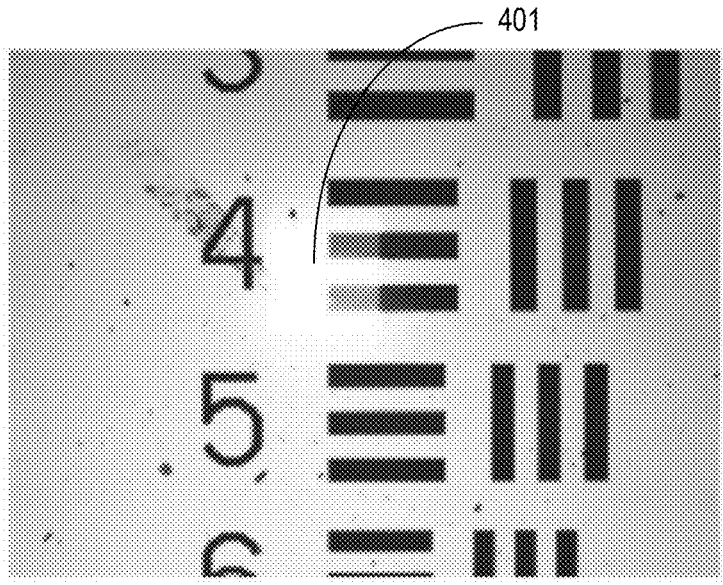
FIG. 4 illustrates an example image acquired by the camera of the spectrometer.

FIG. 4 shows an example sample image in focus position obtained using the video camera of the optical microscope. The sample image was acquired with the marker illumination source was on. As such, the aperture marker 401 was visible as blue color at the center of the multi-colored sample image and the composite image is sharp (i.e., in focus).

At 223, a sharpness score of the sample image acquired at 222 is calculated and provided to an optimization algorithm. The sharpness score measures the sharpness of the sample features (or objects) captured in the sample image. The sharpness score may be determined using image processing algorithms, such as Sobel or Morphological gradient. The sharpness score may be maximized using an optimization algorithm. The optimization algorithm may be the same or different from the optimization algorithm used in the first part of the auto-focusing procedure. The optimization algorithm outputs the amount and the direction of the adjustment.

At 224, method 200 determines whether the optimization is completed. The optimization may be completed responsive to the change of the sharpness score is low or the amount of adjustment is lower than the minimum step size. If the optimization is done, method 200 proceeds to 228. Otherwise, the sample position is adjusted at 226 based on the optimization algorithm output.

At 228, the sample image is acquired using the optical microscope and the camera. The sample image may be displayed to the user At 230, the controller receives user selection of the sample region that is to be analyzed by the analytical system. The user selection may be made via the UI.

At 232, The aperture size is adjusted for analyzing the sample composition. The aperture size may be adjusted based on a spatial resolution set by the user. Further, the third light (such as NIR-IR light generated by the analytical system illumination source 130 of FIG. 1) is directed towards the sample without passing the aperture. The third light may be reflected by beam splitter 131 and pass-through beam splitter 156 before being projected on the sample via the objective 170. The reflected light from sample is collected by the objective, reflected by beam splitter 156. The reflected light that has passed the aperture is collected by detector 150 as a spectrum.

At 234, the controller determines the sample composition based on the spectral data. The sample composition may be displayed together with the sample image, for example, by overlaying the color-coded composition on the sample image.

In this way, the two-part auto-focusing procedure allows for a faster and more accurate auto-focusing to be performed. The first part, wherein the sample position is adjusted based on the aperture marker image, may provide fast and coarse adjustment than the second part, wherein the sample position is adjusted based on the full color sample image. Comparing to using only the sample images for auto-focusing, the first part of the auto-focusing procedure makes sure that the sample surface is positioned at a preferred position (e.g., relatively close to the focal point of the spectrometer) for the second part of the auto-focusing procedure. This is important especially when the ghost image is observed.

In some examples, the second part of the auto-focusing procedure may be skipped. For example, the sample position is not adjusted based on the sample image if the sample surface lacks high contrast objects.

In some examples, the analytical signal (i.e., signal for generating the spectrum) can be used for positioning the sample. An optimization algorithm may be used to maximize the signal-to-noise ratio of the analytical signal. However, acquiring a spectrum is generally more time consuming than acquiring the aperture marker image or sample image.

Figure 9:
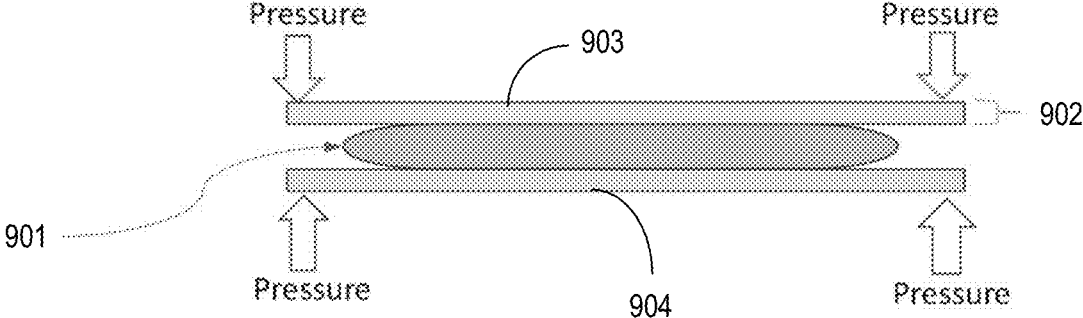
FIG. 9 illustrates an example schematic of a compression cell.

In some examples, the second part of the auto-focusing procedure may be skipped when analyzing a sample compressed within a compression cell. As shown in FIG. 9, the compression cell is a transparent device used to compress a sample 901 between two transparent windows (903 and 904). The two windows of the compression cell can be diamond (or other crystalline, such as KBr) of known thickness (902) and refractive index. The first-part of the auto-focusing procedure (adjusting sample position based on aperture marker image) can be employed to bring the focal point aligned with the top surface of the compression cell (i.e., the surface closest to the optics of the optical microscope and the analytical optical system). Because the thickness (902) of the top window is known, an additional movement of the focal point can be provided to bring the focal point into the middle of the two windows where the sample is compressed. This will also allow for a better spectrum to be generated as the light to be analyzed is from the sample. As a result, if a compression cell is being used (e.g., as indicated in software that is accessible to the computer control system), then the thickness of the top window of the compression cell is used to further move the focal point.

The invention claimed is:

1. An imaging system, comprising:
a sample stage for positioning a sample;
an aperture;
a camera;
an objective;
an analytical system illumination source for generating a third light;
a detector; and
a controller including a processor and a non-transitory memory, wherein by executing computer readable instructions stored in the non-transitory memory, the imaging system is configured to:
  direct a first light to the sample sequentially through the aperture and the objective;

US 12,601,632 B2

11 generate a first image including an aperture marker by collecting light from the sample via the camera;

determine a similarity score based on the first image and an expected aperture marker image;

adjust a distance between the objective and the sample stage based on the similarity score;

direct the third light towards the sample without passing the aperture;

collect light from the sample passed through the aperture via the detector, and generate a spectrum; and analyze sample composition based on the spectrum.

2. The imaging system of claim 1, further includes an optical microscope illumination source for generating a second light, wherein the imaging system is further configured to:

after adjusting the distance between the objective and the sample stage based on the similarity score, direct the second light towards the sample through the objective and acquire a second image using the camera, wherein the second light is directed towards the sample bypassing the aperture; and adjust the distance between the objective and the sample stage based on the second image.

3. The imaging system of claim 1, wherein determine the similarity score based on the first image and the expected aperture marker image includes, determine the similarity score based on features of the aperture marker in the first image and features of an expected aperture marker in the expected aperture marker image.

4. The imaging system of claim 3, wherein the features of the aperture marker in the first image includes at least one of a shape, a size, a compactness, and a position of the aperture maker in the first image.

5. The imaging system of claim 1, wherein the first light has a wavelength bandwidth (FWHM) less than 50 nm.

6. The imaging system of claim 1, wherein adjust the distance between the objective and the sample stage includes adjusting a position of the sample stage.

7. The imaging system of claim 1, wherein the sample is positioned in a compression cell including at least one window, and the imaging system is further configured to: adjust the distance between the objective and the sample stage based on a thickness of the window.

8. The imaging system of claim 1, wherein the imaging system is further configured to provide the similarity score to an optimization algorithm, and wherein adjusting the distance between the objective and the sample stage based on the similarity score includes adjusting the distance between the objective and the sample stage based on an output of the optimization algorithm.

9. The imaging system of claim 1, wherein the expected aperture maker image is determined based on the aperture used for directing the first light.

10. A method for positioning a sample in an imaging system, comprising:

directing a first light to the sample sequentially through an aperture and an objective;

12 generating a first image including an aperture marker by collecting light from the sample via a camera;

determining a similarity score based on the first image and an expected aperture marker image;

adjusting a distance between the objective and the sample based on the similarity score;

directing a third light towards the sample via the objective without passing the aperture;

collecting light from the sample passed through the aperture via a detector, and generate a spectrum; and analyzing sample composition based on the spectrum.

11. The method of claim 10, further comprising:

acquiring a second image of the aperture marker after adjusting the distance between the objective and the sample;

updating the similarity score based on the second image and the expected aperture marker; and adjusting the distance between the objective and the sample based on the updated similarity score.

12. The method of claim 10, further comprising providing the similarity score to an optimization algorithm, and adjusting the distance between the objective and the sample based on the similarity score includes adjusting the distance between the objective and the sample based on an output of the optimization algorithm.

13. The method of claim 12, wherein the output of the optimization algorithm includes one or more of an amount of the adjustment and a direction of the adjustment.

14. The method of claim 10, further comprising:

after adjusting the distance between the objective and the sample based on the similarity score, directing a second light towards the sample through the objective and acquire a second image using the camera, wherein the second light is directed towards the sample bypassing the aperture; and adjusting the distance between the objective and the sample based on the second image.

15. The method of claim 14, wherein adjusting the distance between the objective and the sample based on the second image includes adjusting the distance between the objective and the sample based on a sharpness of at least one sample features in the second image.

16. The method of claim 10, wherein the first light is a visible light and the third light is a near-infrared to infrared light.

17. The method of claim 10, further comprising: after adjusting the distance between the objective and the sample based on the similarity score, directing a second light towards the sample and acquiring a sample image via the camera; and displaying the sample image with the sample composition.

18. The method of claim 17, wherein the first light has a narrower wavelength bandwidth than the second light.

19. The method of claim 10, further comprising displaying the first image on a display.

* * * * *